United States Patent
Gehlen

[15] 3,698,350
[45] Oct. 17, 1972

[54] AMPHIBIOUS VEHICLE

[72] Inventor: Hermann Walter Gehlen, Pirmasenser Strasse 60, Kaiserslautern, Germany

[22] Filed: Nov. 10, 1969

[21] Appl. No.: 875,099

[30] Foreign Application Priority Data

May 23, 1969 Germany..........P 19 26 388.8

[52] U.S. Cl. ................115/1 R, 114/67 A, 180/126
[51] Int. Cl. .................................................B63f 3/00
[58] Field of Search......115/1 R, 1 A, 1 B; 114/67 A, 114/67; 180/125–127, 116

[56] References Cited

UNITED STATES PATENTS

| | | | |
|---|---|---|---|
| 3,040,688 | 6/1962 | Gram | 114/67 A |
| 3,237,708 | 3/1966 | Strasser et al. | 180/116 X |
| 3,446,175 | 5/1969 | Boehler et al. | 115/1 |

Primary Examiner—Milton Buchler
Assistant Examiner—F. K. Yee
Attorney—Robert H. Jacob

[57] ABSTRACT

The amphibious vehicle which has a buoyant vehicle body and marine drive means for movement in water and wheels for driving on land, is provided at its bottom by substantially equally distributed air discharge nozzles supplied from a source of air under pressure to form a film of air between the bottom of the vehicle and any ground of muddy or sludgy consistency.

1 Claim, 2 Drawing Figures

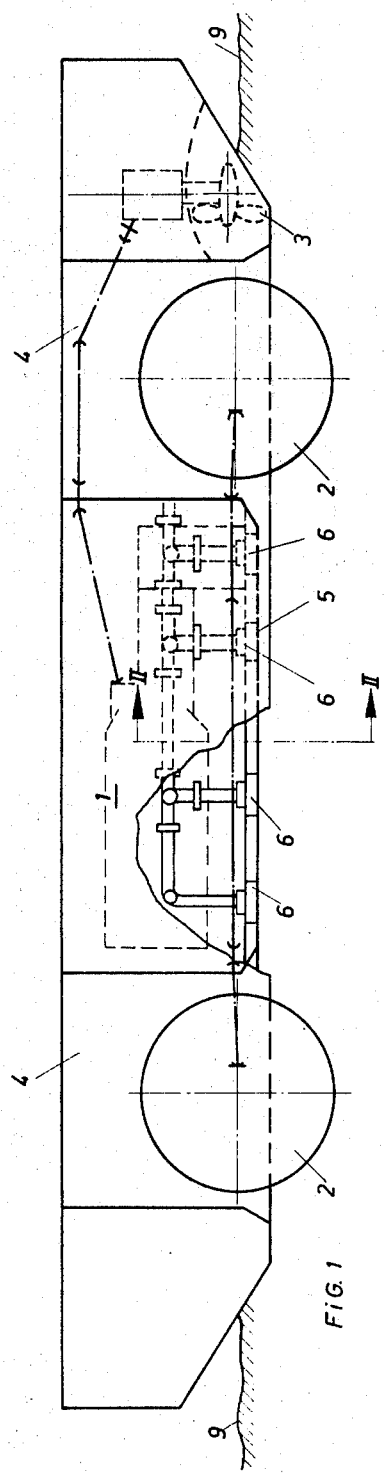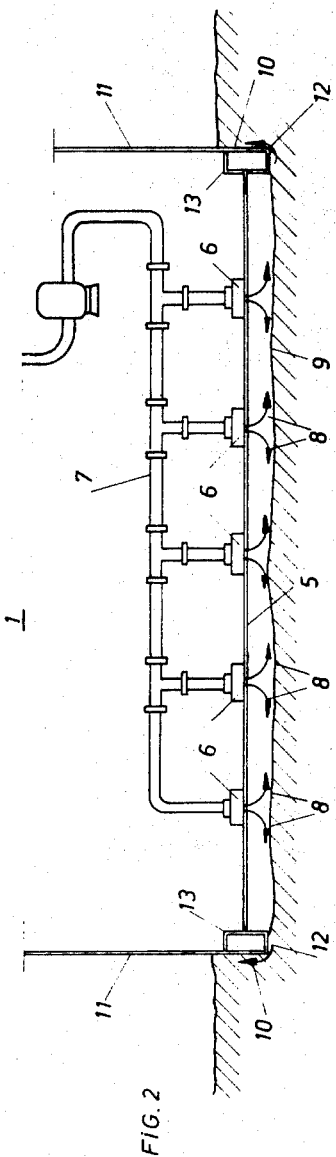

AMPHIBIOUS VEHICLE

BACKGROUND OF THE INVENTION

The invention relates to amphibious vehicles and is particularly concerned with the construction of such a vehicle in a manner that it can readily move in swampy or sludgy terrain.

Amphibious vehicles must be able to move rather extensively and equally well in water as well as also on solid ground. This applies to conditions of transition such as exist above all in the intermediate zones between water and solid land, i.e., where the ground consists essentially of solid components but which being saturated by water, are of a sludgy soft composition.

The invention is based on the problem of so constructing or equipping an amphibious vehicle that it remains mobile particularly in these transition regions in water as well as also on land, which requires that ways and means must be found to eliminate the adhesive suction of the swampy ground at the bottom side of the vehicle body or at least to decrease it.

In accordance with the invention this problem is solved by an amphibious vehicle, the bottom side of which is provided with air discharge nozzles equally distributed over the surface thereof and which are in communication with a source of air.

These air discharge nozzles form an air film between the surface of the swampy ground and the bottom surface of the vehicle which decreases the known and dreaded suction of the ground of swampy consistence on the body of the vehicle and thus opposes or at least minimizes the decrease of the mobility of the vehicle.

Vehicles are already known that are referred to as air cushion vehicles which move along upon an air pad that is likewise produced by air discharge nozzles and with the inclusion of a propeller or repulse drive, but in these vehicles the air pad formed is an integrated component of the transportation mechanism. As compared to this the movement of the amphibious vehicle in accordance with the invention is effected as determined by the condition of the ground either by the marine drive, or by the land drive on its wheels, or simultaneously with both drives. The air film is provided to make possible the onward movement and thus is not required as an integrated component of the drive. It serves merely for forming a separating layer between ground and the bottom of the vehicle that is intended to prevent the vehicle from sucking onto and holding fast on the ground.

As a further development in accordance with the invention the bottom surface of the vehicle may be surrounded by a downwardly extending rigid frame which in cooperation with the air discharge nozzles favors the development of the air film and which furthermore is simultaneously suitable as a seating frame for the vehicle when it retracts its wheels in different phases of deployment on solid ground and when the vehicle body is seated on the ground. Here this frame serves simultaneously also for preventing damage to the air discharge nozzles and their surroundings.

BRIEF DESCRIPTION OF THE DRAWINGS

Further features and details of the invention and advantages obtained thereby will become apparent from the following specification with reference to the accompanying drawing which schematically shows an embodiment of the subject of the invention and in which:

FIG. 1 is a side view of an amphibious vehicle in accordance with the invention partly in section, and FIG. 2 is a section taken along line II—II in FIG. 1 drawn to a larger scale.

DESCRIPTION OF THE INVENTION

The vehicle body 1 of the amphibious vehicle is equipped in a known manner with wheels 2 for driving on land and with a water drive 3 for movement on water. The wheels 2 may also be retracted upwardly in a known manner into wheel chambers 4 provided for this purpose so that the vehicle may be seated on the ground to perform different tasks with its vehicle body 1.

The movement on solid land as well as also the movement in water has been satisfactorily solved by previously disclosed and published means. However, difficulties arise in the movement of such vehicles in intermediate areas between water and solid ground which have to be overcome in an equally satisfactory manner. Depending on the condition of the swampy sludgy ground that exists there the ground sucks itself more or less onto the flat bottom surface 5 of the vehicle 1 and decreases or prevents the moving possibilities as a result of the adhesion thus developed.

In order to overcome this it is proposed in accordance with the invention to equally distribute air discharge nozzles 6 on the flat bottom surface 5 of the vehicle which are in communication with a source of air pressure by way of a conduit system 7. The nozzles are mounted flush on the interior side of bottom surface 5 without any portion of the nozzle structure extending below the lower side of the bottom surface.

The discharging air under pressure is distributed somewhat in the manner indicated by arrows 8 between the flat bottom surface 5 of the vehicle 1 and the surface 9 of the ground and thus forms an air film which separates the two surfaces from one another.

It has been found that the areas 10 at the side walls 11 of the vehicle body 1 constitute a sufficient seal with respect to the surrounding atmosphere so that an air film can be built up in the desired and expected manner before excess air can break through an escape in the direction of the arrows 12.

In order to improve the development of the film and to protect the air discharge nozzles 6 when the vehicle 1 is set down on solid ground, the body is equipped with a circumferentially extending stiff seating frame 13 which extends downwardly beyond the flat bottom surface 5 of the vehicle 1 and which simultaneously can also act as a depositing frame that may be required.

Having now described my invention, what I desire to protect by letters patent is set forth in the appended claims:

1. Amphibious vehicle having a buoyant body, with a generally flat bottom surface and marine drive means for propulsion in water, and wheels and drive means therefor for movement on land, comprising a plurality of downwardly directed air discharge nozzles mounted in said generally flat bottom surface in generally evenly distributed relationship, and flush with a source of compressed air for supplying air to said nozzles to form an air film between said flat bottom surface of said vehicle and swampy, sludgy ground, thereby counteracting the suction effect between said bottom surface and such ground and a stiff seating frame extending circumferentially of and projecting downwardly from said bottom surface.

* * * * *

UNITED STATES PATENT OFFICE
CERTIFICATE OF CORRECTION

Patent No. 3,698,350            Dated October 17, 1972

Inventor(s) Hermann Walter Gehlen

It is certified that error appears in the above-identified patent and that said Letters Patent are hereby corrected as shown below:

Claim 1, line 65    before "said" insert --and flush with--;

line 66    delete "flush with".

Signed and sealed this 15th day of May 1973.

(SEAL)
Attest:

EDWARD M. FLETCHER, JR.            ROBERT GOTTSCHALK
Attesting Officer                      Commissioner of Patents